Nov. 18, 1952    H. E. BEDFORD ET AL    2,618,346
FIRE EXTINGUISHING INSTALLATION
Filed Jan. 11, 1950    3 Sheets-Sheet 1

INVENTORS.
HOWARD E. BEDFORD
THOMAS A. M. MILLS
BY H. C. Diesem
ATTORNEY.

INVENTORS.
HOWARD E. BEDFORD
THOMAS A. M. MILLS

BY H. C. Dieserud

ATTORNEY.

INVENTORS.
HOWARD E. BEDFORD
THOMAS A. M. MILLS
BY H. C. Diesend
ATTORNEY.

Patented Nov. 18, 1952

2,618,346

UNITED STATES PATENT OFFICE 2,618,346

FIRE-EXTINGUISHING INSTALLATION

Howard E. Bedford and Thomas A. M. Mills, Brentford, England, assignors to Pyrene Manufacturing Company, Newark, N. J., a corporation of Delaware Application January 11, 1950, Serial No. 137,926
In Great Britain January 13, 1949

12 Claims. (Cl. 169—4)

1

This invention relates to apparatus for delivering fire-extinguishing foam to tanks containing inflammable liquids, such as oil or the like. More particularly, it relates to such apparatus equipped with improved sealing devices adapted to prevent flow of fluid material therethrough under normal circumstances but capable of being readily destroyed so as to permit substantially unobstructed flow of the fire-extinguishing foam into the tank, as required.

It is a primary object of the invention to provide fire-extinguishing apparatus with an improve sealing means adapted to effectively prevent fluid flow into or from a tank under normal conditions, but so constructed and arranged as to be readily broken and allow substantially unobstructed flow of fire-extinguishing foam into the tank in the event of an outbreak of fire in the tank.

Another object of the invention is to provide fire-extinguishing apparatus with improved sealing means that is reasonable in manufacturing cost and that is adapted to be easily and quickly installed or replaced.

A further object of the invention is to provide apparatus of the character indicated including a sealing means so arranged with respect to other parts as to permit of ready inspection.

A further object of the invention is to provide fire-extinguishing apparatus which is capable of performing its intended functions in an effective and trouble-free manner.

Storage tanks containing oil or other highly inflammable material are frequently protected against fire by suitable installations including a conduit for delivering fire-extinguishing foam into the interior thereof in the event of an outbreak of fire. It is usually the practice to equip such an installation with a sealing element for reducing the escape of vapors from the tank. Such sealing elements are adapted to be torn away from the interior of the conduit to a sufficient extent by pressure of the foam supplied by the conduit to thereby permit transmission of the foam to the tank. Present-day sealing elements of this type generally comprise a relatively thin metallic diaphragm. Such a diaphragm is lightly clamped, usually between flanges of the conduit or to a retaining ring, in a manner to permit of its being distorted or torn away from the clamping parts upon being subjected to the pressure of the fire-extinguishing foam.

Experience has demonstrated that conventional sealing elements are unsatisfactory in several respects. For one thing, they permit leakage around the edges and therefore do not constitute an effective seal. If clamped tightly, such sealing elements are incapable of being dislodged or torn away from the conduit by foam pressure. Furthermore, such sealing elements, even when torn away, tend to more or less obstruct the flow of foam through the conduit.

The present invention obviates the difficulties outlined above as it provides a fluid-tight seal that is adapted to be broken by fluid pressure and permit substantially unobstructed flow of foam into the tank. A seal constructed in accordance with this invention comprises a frangible partition adapted to be supported across the interior of a foam-transmitting conduit and clamped or otherwise secured thereto in fluid-tight relation. The partition may be made of any suitable impervious brittle material, including glass, a ceramic composition such as porcelain, or a plastic composition. The partition is tightly clamped around its marginal portion and is reenforced centrally by a coating or layer of relatively thin flexible material that may comprise a textile fabric such as linen, a coating of a suitable plastic, or any other appropriate material. The reenforcing renders the central part of the partition more resistant to shattering or breakage with the result that the central part is completely separated from the outer part upon being subjected to fluid pressure. It is recommended that a reenforcing coating be provided on partitions that are otherwise substantially uniform in thickness, and such reenforcement should extend close to but slightly spaced from the clamped marginal portion so that the opening defined by the central part, upon separation, will not substantially obstruct flow of foam through the conduit.

The reenforcement is preferably applied to that face of the partition which is directed toward the inlet of the conduit. We recognize that the seal may be accidentally placed in the conduit with its reenforced face directed toward the outlet. Accordingly, it is recommended that if the vapors of the contents of the tank are corrosive to the material of the reenforcement, the reenforcement should be waxed, dressed or otherwise treated to render it resistant to such vapors.

In lieu of applying a reenforcing coating to the partition, the partition may be so formed that its major central part is thicker than a minor continuous part intermediate the central part and the marginal part. This construction will insure separation of the central part from the remainder of the partition along the continuous minor part of thinner cross section in the same manner as where a reenforcing coating is used.

The seal of this invention may be placed at any desired location in the foam supply conduit. If the pressure of the foam is relatively low, it is recommended that the seal be placed near the inlet to insure that the maximum available pressure is utilized to break it. It is often more desirable to keep tank vapors out of the conduit and to be able to readily inspect the seal without permitting vapors to escape. In the latter case, the seal should be located near the tank end of the conduit.

Foam used in fire-extinguishing installations of the character under consideration is generally produced by intimately admixing water, a foam-stabilizing compound and air, the water entraining the necessary air by ejector action. One form of apparatus successfully employing this principle includes a jet head or nozzle by which one or more jets of liquid are directed into a foam pipe or conduit. The latter is provided with an open end or is formed with lateral openings through which air is drawn into a conduit by the partial vacuum created by the jet or jets of liquid. This liquid which is transmitted through the jet head may be water containing the foam-stabilizing compound in solution, or the water may be caused to entrain both the air and the foam-stabilizing compound, the solution then being formed during the mixing with the air. If the water is delivered to the apparatus by a pump, the pressure, even at the top of a riser pipe on the side of a large oil tank, is usually sufficient to break the diaphragm immediately. However, when the water is supplied by a main, the pressure at the top of a riser pipe may be low. In many existing installations, the total pressure on the seal, when the water is turned on, is not great enough to break the seal. This difficulty may be overcome in various ways.

One manner of overcoming this difficulty is by forming an annular groove in the partition intermediate the reenforced central part and the marginal part. This permits the central part to be cleanly broken away from the remainder of the partition under relatively low pressures. However, care should be exercised to avoid forming this groove so deep as to weaken the partition to such an extent that it will break when being clamped in position.

A more positive way of insuring breakage of the partition under low pressure conditions is to utilize the pressure of water supplied by a branch or by-pass pipe to effect breakage of the partition before the foam reaches it. Such a branch pipe may, for example, extend from the upstream side of the foam-producing apparatus to a point in the conduit close to the seal. In order to cut off the supply of water through this branch pipe automatically and immediately after the seal has been broken to avoid dilution of the foam by water supplied by the branch pipe, a valve may be provided in the branch pipe. Such a valve may comprise a disc carrying a plunger which rests on the partition so that as long as the partition is intact, the valve is maintained in open position, but as soon as the partition breaks, the valve moves into closed position, preventing further flow of water through the branch pipe.

Another way of insuring breakage of the partition when the foam pressure is low is to close the air intake in the foam-producing apparatus by a valve so that when the water is admitted in the conduit, air is compressed in the conduit and sufficient pressure is created to break the partition. This valve is adapted to open automatically as soon as the seal is broken and is preferably of the flap type which is open as a consequence of the suction action of the water flowing through the conduit.

The earlier enumerated objects, as well as additional objects, together with the advantages attainable by the practice of this invention, will be readily understood by persons skilled in the art upon reference to the following detailed description taken in conjunction with the annexed drawings, which respectively describe and illustrate preferred arrangements of apparatus embodying the invention.

Figure 1:
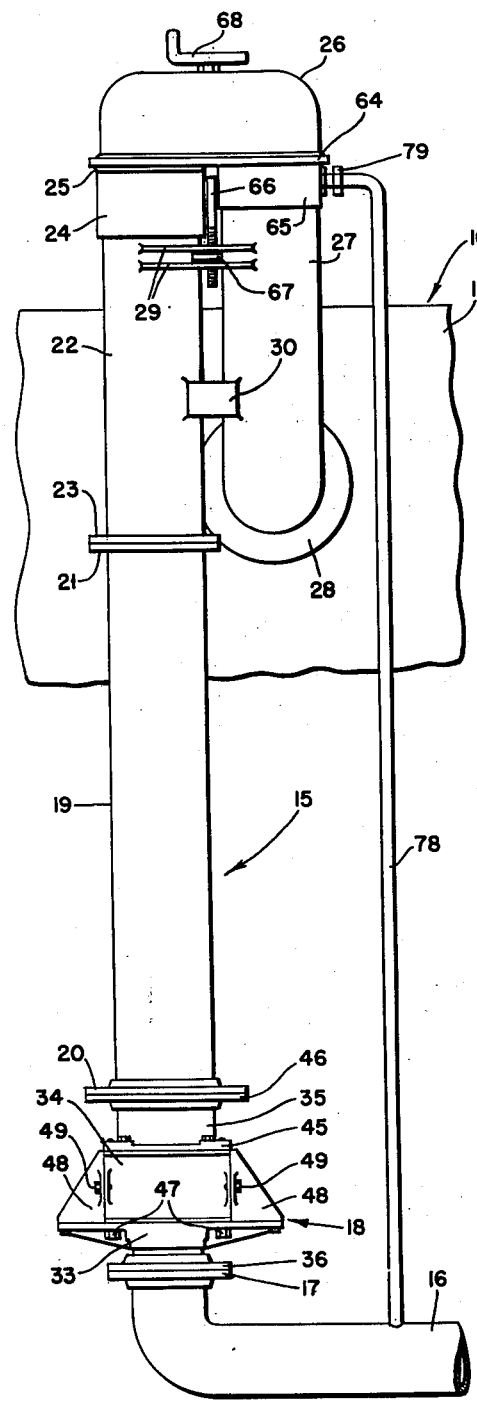
Figure 1 is a view in elevation of an arrangement of apparatus constructed in accordance with the invention.

Referring now to the drawings, wherein like reference numerals denote corresponding parts throughout the several views, the apparatus of this invention is adapted to supply fire-extinguishing foam into a tank, generally indicated by numeral 10 and comprising a cylindrical side wall 11, having a circular opening 12, and a top wall 13. The contents of the tank, which may be oil or other highly inflammable liquid, is designated by numeral 14.

A conduit or riser pipe arrangement 15 is adapted to deliver fire-extinguishing foam into the tank above the level of the stored liquid. The lower end of the conduit is adapted to be connected to a suitable source of fire-extinguishing foam supply (not shown), and includes a bent pipe section 16 having a flange 17. A unit 18 to be described in detail further along herein is positioned on flange 17. Directly above unit 18 is a first vertical pipe section 19 having lower and upper flanges 20 and 21, respectively. Section 19 communicates with unit 18 and with a second vertical pipe section 22 that is provided with a lower flange 23 for connection by means of bolts or the like to flange 21. A sleeve 24 is carried at the upper end of pipe section 22 and is formed with a flange 25.

Figure 2:
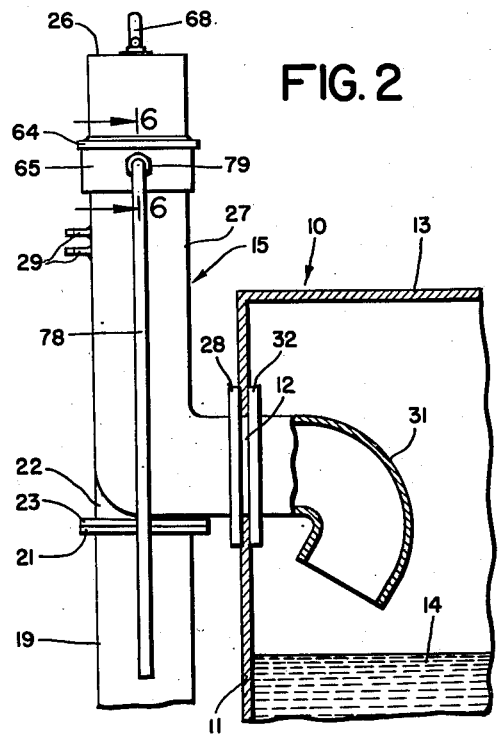
Figure 2 is a view of the upper portion of the apparatus of Figure 1 taken from the right thereof, certain parts being shown in cross section for better illustration.

Mounted on sleeve 24 and pivotal about the axis of pipe section 22 is a hollow swivel head 26 which, when in the relative position shown in Figures 1 and 2, establishes communication between pipe section 22 and a pipe section 27 that communicates with opening 12 in the tank side wall and is provided with a flange 28 for attachment to the tank side wall. Pipe sections 22 and 27 are maintained in the illustrated spaced-apart parallel relation (Figure 1) by a pair of integrally formed cross ribs 29 and a web 30.

An elbow 31 has a flange 32 for attachment to the tank side wall. This elbow, as shown in Figure 2, communicates with opening 12 and, therefore, with pipe section 27. Fire-extinguishing foam supplied by conduit 15 is discharged through elbow 31 above the level of oil 14 and is directed by the elbow toward the interior of the tank side wall so as to spread the foam over the surface of the oil.

Figure 4:
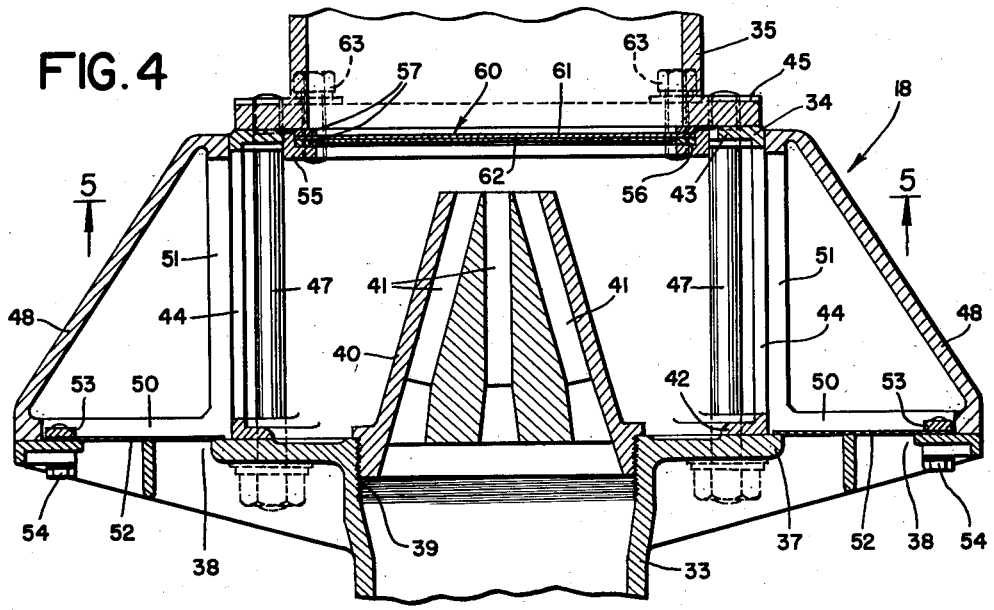
Figure 4 is an enlarged vertical central sectional view through unit 18 of Figure 1.
Figure 5:
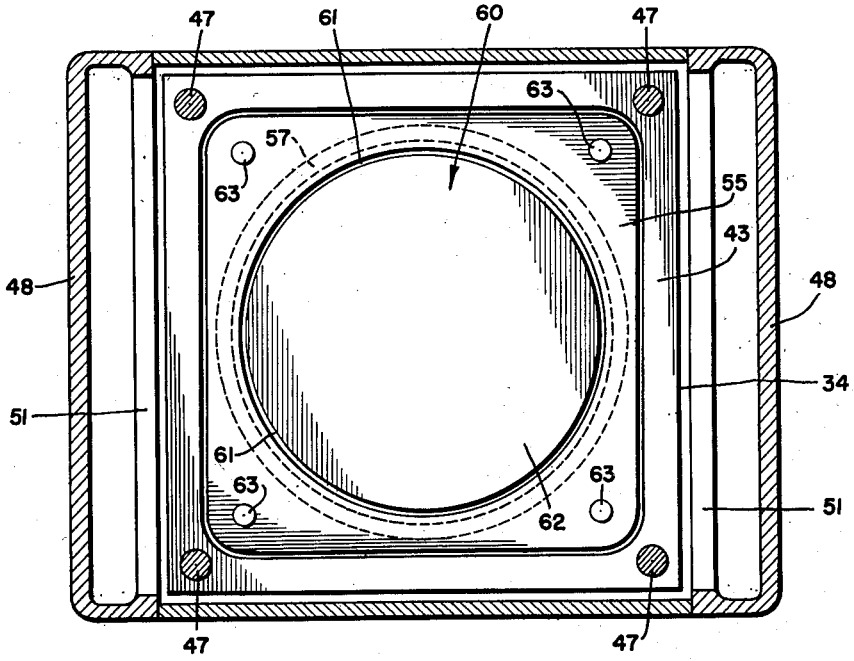
Figure 5 is a view taken along line 5—5 of Figure 4.

Reference is next had to Figures 1, 4 and 5 for an understanding of the construction of unit 18. This unit comprises a lower tubular member 33, an intermediate tubular member 34 and an upper tubular member 35. Lower tubular member 33 is formed with a first flange 36 that is bolted to flange 17 and a second flange 37 having a pair of oppositely arranged openings 38. The upper end of tubular member 33 is internally threaded, as indicated at 39 in Figure 4, to receive an externally threaded frustro-conical jet head or nozzle 40 having a plurality of jet passages 41. Tubular member 34 is provided with inwardly extending flanges 42 and 43 and a pair of oppositely disposed side openings 44. Upper tubular member 35 has a lower flange 45 and an upper flange 46. The tubular members are assembled and united, as illustrated in Figure 4, through the medium of a plurality of studs 47.

A pair of stationary hoods 48 is connected to intermediate tubular member 34 by studs 49 (Figure 1). Each hood is open at the bottom and on one side, as indicated at 50 and 51, respectively, in Figure 4, whereby air from the atmosphere may enter each hood by way of openings 38 and flow into intermediate tubular member 34 through its side openings 44. Admission of air into unit 18 is controlled by a pair of flap valves 52, each of which is secured to a corresponding flange 37 by a bar 53 and studs 54.

Wholly within unit 18 is a sealing means that comprises a retaining ring or hollow support 55 having an annular groove 56 in which is positioned a pair of gaskets 57. A sealing member or partition 60, that comprises a frangible disc 61 made of glass or other suitable material, and a reenforcing cover or coating 62, of the character referred to earlier herein, over the major central portion of the disc, has its marginal part disposed between the gaskets. The sealing means, comprising ring 55, gaskets 57, and partition 60, is clamped in place by studs 63.

As is shown in Figure 4, partition 60 is located above and spaced from the upper or discharge end of nozzle 40. This arrangement permits fluid discharged upwardly through the nozzle to impinge against the reinforced central part of the partition and effect severance or separation of the reenforced part from the part immediately adjacent thereto.

In operation, a fire-extinguishing composition that may comprise water and a foam-stabilizing material is introduced, under suitable pressure, into conduit 15 by way of pipe section 16. This composition is jetted upwardly through nozzle 40 and impinges against the under face of partition 60. The pressure within intermediate tubular member 34 and hoods 48 is greater than the pressure of the atmosphere, with the result that flap valves 52 are maintained in illustrated closed position. Due to the pressure exerted by the composition against the partition, the reenforced part of the partition is completely severed or separated from the remainder. This permits substantially unobstructed upward flow of the composition through the conduit and into the tank. Upon breaking of the partition, the upward flow of the composition creates a pressure drop in hoods 48, causing flap valves 52 to open and permitting necessary air for foam-generating purposes to be aspirated through flange openings 38.

Figure 3:
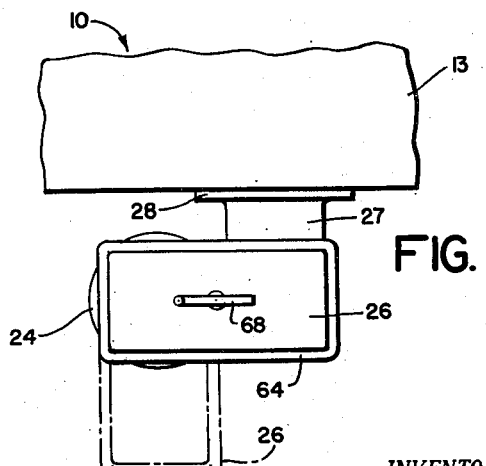
Figure 3 is a top plan view of Figure 2, parts being omitted.

Swivel head 26 is adapted to place pipe section 22 into and out of direct communication with pipe section 27, depending upon its relative position with respect to the latter pipe section. The swivel head is provided with a continuous flange 64 that bears against flange 25 of sleeve 24 and against the upper end of a similar sleeve 65, carried by pipe section 27, when the parts are in the position shown in Figures 1 and 2 and in the full line position shown in Figure 3. The swivel head is clamped in the position shown in Figures 1 and 2 by a clamping screw 66 that engages a tapped nut-like member 67 that is located between reenforcing ribs 29. Screw 66 may be readily disengaged from member 67 by actuating a handle 68. The swivel head may be unclamped and swung about the axis of pipe section 22 to the dotted position shown in Figure 3 when it is desired to test the apparatus or for other purposes.

Figure 6:
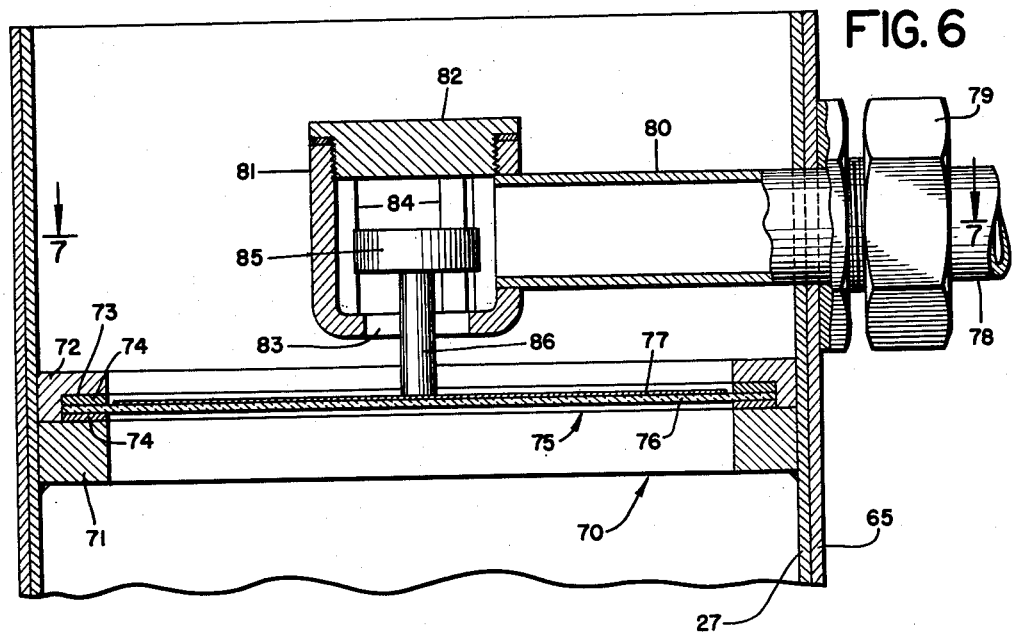
Figure 6 is an enlarged view taken along line 6—6 of Figure 2 and shows a sealing means constructed in accordance with the invention positioned at another location.
Figure 7:
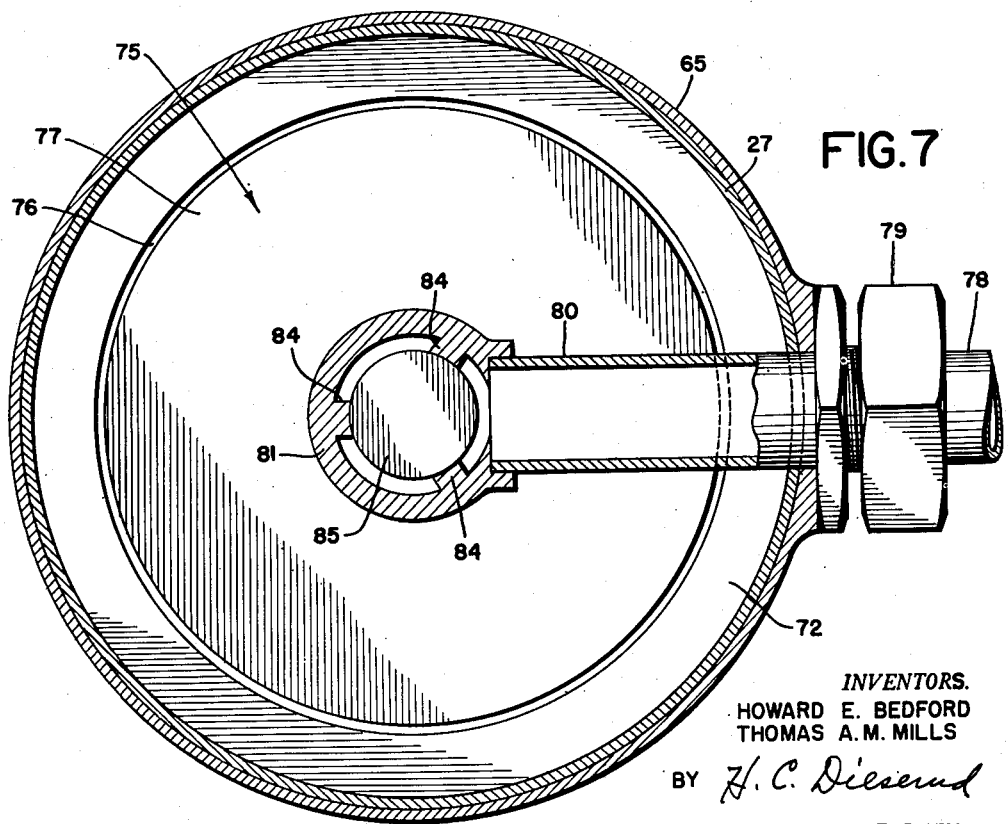
Figure 7 is a view taken along line 7—7 of Figure 6.

If lieu of arranging the sealing means in unit 18, as shown in Figures 4 and 5, the same or its equivalent may be placed in pipe section 27, as shown in Figures 6 and 7. This affords several advantages over the arrangement shown in Figures 4 and 5. First, the sealing means, by virtue of its location close to the foam inlet to the tank, excludes tank vapors from the major portion of the conduit. Also, the sealing means may be readily inspected or tested by merely swinging head 26 from the full line position to the dotted line position (Figure 3), thereby exposing the sealing means to view.

Sealing means 70 of Figures 6 and 7 comprises a stationary support ring 71 positioned within pipe section 27 and secured thereto in any desired manner, such as by welding. A removable ring 72 is disposed above ring 71 and is provided with an annular groove 73 adapted to receive a pair of gaskets 74. A sealing member or partition 75, which may be identical with or similar to partition 60 of Figures 4 and 5, comprises a frangible disc 76 having a reinforcing coating 77.

Partition 75 may be broken in the manner earlier described by foam supplied by conduit 15. In the event that the foam pressure on the partition is too low to readily break the same, water for effecting breakage of the partition may be supplied by a branch pipe 78. This pipe may be connected to a suitable source of water supply under sufficient pressure, or may be connected to the upstream end of conduit 15, as shown in Figure 1. Pipe 78 is connected by a union 79 to a nipple 80 that projects into pipe section 27. Nipple 80 is connected at its inner end to a valve casing 81 having a removable plug 82 at its upper end and a discharge opening or outlet 83 in its lower end. The casing has a plurality of internal, angularly spaced ribs 84 for guiding a disc valve 85. Secured to and depending from valve 85 is a stem or plunger 86 that extends through outlet 83 and bears against the upper surface of partition 75. Thus, it will be seen that when the parts are in the relative position shown in Figure 6, the partition maintains the valve in open position. This permits water supplied by branch pipe 78 to be discharged through outlet 83 and impinge against the upper surface of partition 75 to effect separation of the central portion of the partition from the remainder thereof. As soon as the partition is broken, the central portion drops in pipe section 27, allowing valve 85 to move downwardly to close outlet 83 and prevent further flow of water therethrough.

From the foregoing, it is believed that the construction, operation and advantages of my present invention will be readily comprehended by persons skilled in the art. It is to be clearly understood, however, that various changes in the apparatus set forth above may be made without departing from the scope of the invention, it being intended that all matter contained in the description or shown in the drawing shall be interpreted as illustrative only and not in a limiting sense.

We claim:

1. In apparatus of the character described, means comprising a conduit adapted to deliver fire-extinguishing foam to a tank, sealing means normally preventing flow of fluid from one portion of the conduit to another, said sealing means comprising a support and a frangible partition across the interior of the conduit and having its marginal part secured to the support, said partition including a continuous minor part intermediate its marginal and central parts, said marginal and intermediate parts being substantially uniform in thickness and thinner and more readily breakable than the central part, whereby the central part is adapted to be separated from the remainder of the partition upon subjecting one side of the partition to a predetermined greater pressure than the other side.

2. In apparatus of the character described, means comprising a conduit adapted to deliver fire-extinguishing foam to a tank, sealing means normally preventing flow of fluid from one portion of the conduit to another, said sealing means comprising a hollow support wholly within the conduit, a frangible partition across the interior of the conduit mounted on the support, and means detachably securing the marginal part of the partition in fluid-tight relation to the support, said partition including a continuous minor part intermediate its marginal and central parts, said marginal and intermediate parts being substantially uniform in thickness and thinner and more readily breakable than the central part, whereby the central part is adapted to be completely separated from the remainder of the partition upon subjecting one side of the same to a predetermined greater pressure than the other side.

3. In apparatus of the character described, means comprising a conduit adapted to deliver fire-extinguishing foam to a tank, sealing means normally preventing flow of fluid from one portion of the conduit to another, said sealing means comprising a support and a frangible partition across the interior of the conduit and having its marginal part secured to the support, the partition including a central part constituting a major portion thereof and spaced inwardly from the interior of the hollow support, said major part including a reenforcing covering to render the same less readily breakable than the part immediately adjacent thereto, whereby the central part is adapted to be completely separated from the remainder of the partition upon subjecting one side of the partition to a predetermined greater pressure than the other side.

4. In apparatus of the character described, means comprising a conduit adapted to deliver fire-extinguishing foam to a tank, a nozzle in the conduit for transmitting fluid from one portion thereof to another, the discharge end of the nozzle being spaced from the interior of the conduit, sealing means normally preventing flow of fluid from one portion of the conduit to another, said sealing means comprising a support and a frangible partition across the interior of the conduit and adjacent to and spaced from the discharge end of the nozzle, the partition having its marginal part secured to the support, the part of the partition intermediate its central part and the marginal part being thinner and more readily breakable than the central part, whereby the central part is adapted to be separated from the remainder of the partition by the action of fluid discharged through the nozzle.

5. In apparatus of the character described, means comprising a conduit adapted to deliver fire-extinguishing foam to a tank, a nozzle wholly within the conduit for transmitting fluid from one portion thereof to another and having its discharge end spaced from the interior of the conduit, sealing means normally preventing flow of fluid from one portion of the conduit to another, said sealing means comprising a hollow support and a frangible partition having its marginal part secured to the support, said partition including a continuous minor part intermediate the hollow support and a major central part, said central part being adjacent to and spaced from the discharge end of the nozzle and being more resistant to breakage than the minor part, whereby the central part is adapted to be separated from the remainder of the partition by the action of fluid discharged through the nozzle.

6. In apparatus of the character described, means comprising a conduit adapted to deliver fire-extinguishing foam to a tank, a nozzle wholly within the conduit for transmitting fluid from one portion thereof to another and having its discharge end spaced from the interior of the conduit, at least one opening in the conduit establishing communication between the atmosphere and the discharge end of the nozzle, a check valve for preventing flow of fluid through the opening from the nozzle to the atmosphere but permitting admission of air from the atmosphere into the conduit, sealing means normally preventing flow of fluid from one portion of the conduit to another, said sealing means comprising a hollow support and a frangible partition having its marginal part secured to the support, said partition including a continuous minor part intermediate the hollow support and a major central part, said central part being adjacent to and spaced from the discharge end of the nozzle and being more resistant to breakage than the minor part, whereby the central part is adapted to be separated from the remainder of the partition by the action of fluid discharged through the nozzle.

7. In apparatus of the character described, means comprising a conduit adapted to deliver fire-extinguishing foam to a tank, a nozzle wholly within the conduit for transmitting fluid from one portion thereof to another and having its discharge end spaced from the interior of the conduit, sealing means normally preventing flow of fluid from one portion of the conduit to another, said sealing means comprising a hollow support and a frangible partition having its marginal part secured to the support, the partition including a central part constituting a major portion thereof and spaced inwardly from the interior of the hollow support, said major part including a reenforcing covering to render the same less readily breakable than the part immediately adjacent thereto, said major part being positioned directly opposite and spaced from the discharge end of the nozzle, whereby it is adapted to be completely separated from the remainder of the partition by the action of fluid discharged through the nozzle.

8. In apparatus of the character described, means comprising a conduit adapted to deliver fire-extinguishing foam to a tank, a nozzle wholly within the conduit for transmitting fluid from one portion thereof to another and having its discharge end spaced from the interior of the conduit, at least one opening in the conduit establishing communication between the atmosphere and the discharge end of the nozzle, a check valve for preventing flow of fluid through the opening from the nozzle to the atmosphere but permitting admission of air from the atmosphere into the conduit, sealing means normally preventing flow of fluid from one portion of the conduit to another, said sealing means comprising a hollow support and a frangible partition having its marginal part secured to the support, the partition including a central part constituting a major portion thereof and spaced inwardly from the interior of the hollow support, said major part including a reenforcing covering to render the same less readily breakable than the part immediately adjacent thereto, said major part being positioned directly opposite and spaced from the discharge end of the nozzle, whereby it is adapted to be completely separated from the remainder of the partition by the action of fluid discharged through the nozzle.

9. In apparatus of the character described, means comprising a conduit adapted to deliver fire-extinguishing foam to a tank, sealing means normally preventing flow of fluid from one portion of the conduit to another, said sealing means comprising a support and a frangible partition across the interior of the conduit and having its marginal part secured to the support, the part of the partition intermediate its central part and the marginal part being thinner and more readily breakable than the central part, means including a pipe for transmitting fluid into the conduit and for directing a stream of the fluid against the partition whereby to effect separation of the major part from the remainder thereof, and valve means operable in response to such separation of the major part of the partition to prevent further flow of fluid through the pipe.

10. In apparatus of the character described, means comprising a conduit adapted to deliver fire-extinguishing foam to a tank, sealing means normally preventing flow of fluid from one portion of the conduit to another, said sealing means comprising a hollow support and a frangible partition across the interior of the conduit and having its marginal part secured to the support, said partition comprising a major central part and a continuous minor part intermediate the central part and the hollow support, said minor part being thinner and more readily breakable than the central part, means including a pipe for transmitting fluid into the conduit and for directing a stream of the fluid against the partition whereby to effect separation of the major part from the remainder thereof, and valve means operable in response to such separation of the major part of the partition to prevent further flow of fluid through the pipe.

11. In apparatus of the character described, means comprising a conduit adapted to deliver fire-extinguishing foam to a tank, sealing means normally preventing flow of fluid from one portion of the conduit to another, said sealing means comprising a support and a frangible partition across the interior of the conduit and having its marginal part secured to the support, the partition including a central part constituting a major portion thereof and spaced inwardly from the interior of the hollow support, said major part including a reenforcing covering to render the same less readily breakable than the part immediately adjacent thereto, means including a pipe for transmitting fluid into the conduit and for directing a stream of the fluid against the partition whereby to effect separation of the major part from the remainder thereof, and valve means operable in response to such separation of the major part of the partition to prevent further flow of fluid through the pipe.

12. In apparatus of the character described, means comprising a conduit adapted to deliver fire-extinguishing foam to a tank, sealing means normally preventing flow of fluid from one portion of the conduit to another, said sealing means comprising a support and a frangible partition across the interior of the conduit and having its marginal part secured to the support, the part of the partition intermediate its central part and the marginal part being thinner and more readily breakable than the central part, a branch pipe establishing communication between upstream and downstream portions of the conduit, a valve casing within the conduit and including an inlet connected to the downstream end of the pipe and an outlet adjacent to and spaced from the major part of the partition for directing a stream of fluid against the partition whereby to effect separation of the major part from the remainder thereof, and a valve for controlling flow of fluid through the outlet, said valve being maintained in open position by the partition and being adapted to be moved into closed position in response to such separation of the major part of the partition.

HOWARD E. BEDFORD.
THOMAS A. M. MILLS.

REFERENCES CITED

The following references are of record in the file of this patent:

UNITED STATES PATENTS

| Number | Name | Date |
| --- | --- | --- |
| 564,812 | Winne | July 28, 1896 |
| 1,754,005 | Witter | Apr. 8, 1930 |
| 1,917,694 | Boyd | July 11, 1933 |
| 2,464,026 | Clark | Mar. 8, 1949 |